United States Patent [19]

Schrempp

[11] 3,841,889

[45] Oct. 15, 1974

[54] PROCESS FOR THE PRODUCTION OF EASILY LAKED AZO PIGMENTS

[75] Inventor: Klaus Schrempp, Ludwigshafen, Germany

[73] Assignee: Badische Anilin- and Soda-Fabrik Aktiengesellschaft, Ludwigshafen/Rhein, Germany

[22] Filed: Jan. 9, 1973

[21] Appl. No.: 322,204

[30] Foreign Application Priority Data

Jan. 18, 1972 Germany .......................... 2202143

[52] U.S. Cl. .............................. 106/289, 106/308 F
[51] Int. Cl. ..................... C08h 17/04, C08h 17/66
[58] Field of Search ....................... 106/289, 308 F

[56] References Cited
UNITED STATES PATENTS

| | | | |
|---|---|---|---|
| 2,455,898 | 12/1948 | Ness | 106/289 |
| 2,772,983 | 12/1956 | Grimm et al. | 106/289 |
| 2,811,515 | 10/1957 | Stocher | 106/289 |
| 3,444,157 | 5/1969 | Lanaka | 106/289 |

*Primary Examiner*—Delbert E. Gantz
*Assistant Examiner*—J. V. Howard
*Attorney, Agent, or Firm*—Johnston, Keil, Thompson & Shurtleff

[57] ABSTRACT

A process for the production of easily dispersable laked azo pigments, laking being carried out in the presence of a. a water-soluble salt of a polymerized abietic acid and b. a water-soluble salt of a dialkyl ester of sulfosuccinic acid of 5 to 15 carbon atoms in each alkyl group. The azo pigments obtained may be processed into printing inks by stirring them into printing ink binders.

9 Claims, No Drawings

PROCESS FOR THE PRODUCTION OF EASILY LAKED AZO PIGMENTS

The invention relates to a process for the production of easily dispersable laked azo pigments.

The particles in powdered pigments which are distinguished by a large particle surface are only partly present as primary particles. A substantial part of these particles are present as aggregates and particularly in the form of agglomerates. In use for example for the production of intaglio printing ink the agglomerates have to be disintegrated and the primary particles liberated because it is only by the greatest possible division of the agglomerates that high color strength, high brilliance and other properties in use can be achieved in high quality. The division of the agglomerates is achieved by the action of mechanical energy, for example in a ball mill a kneader or rolling mill, on a suspension of the powdered pigment, for example in a binder solution. This process of division requires a great expenditure of energy and for apparatus with simultaneous low space-time yields.

Many methods have long been known by which powdered pigments having softer grain (i.e., powdered pigments which can be dispersed better) can be prepared. Thus German Pat. No. 1,003,885 discloses that soft grain copper phthalocyanine pigments are obtained when an alkaline earth metal resinate is precipitated on the pigment in the presence of an oxyethylglyoxalidine and an ammonium salt of a strong acid. According to the description in U.S. Pat. No. 3,375,123 powdered pigments which disperse better are obtained by coating the pigment particles with a metal resinate and a salt of a resinate with an organic amine.

U.K. Pat. No. 1,156,835 further discloses that pigments having improved disperability are obtained when a long chain aliphatic amine is stirred in an amount of from 4 to 25 percent by weight based on the pigment into the pigment suspension. According to the disclosure in U.K. Pat. No. 1,156,836 resin amines or derivatives thereof and according to German Laid-Open DOS No. 2,001,505 resins are used together with nonionic surfactants to improve the grain softness of the powdered oigment.

More recently what are known as easily dispersable pigments have been in demand in the processing industry. Easily dispersable pigments are pigments which merely by stirring with what is known as a dissolving stirrer (i.e., a high speed rotating stirrer fitted with a stirring blade of special shape) can be brought into the necessary fine dispersion for further processing and which do not need to be ground and dispersed with conventional grinding equipment such as three roll mills or ball mills.

The property of easy dispersability therefore is far more than is understood by soft grain or of good dispersability.

There is therefore a need for a process according to which azo pigments are obtained which are easily dispersable.

We have found that easily dispersable laked azo pigments are obtained by coupling an aromatic amine containing acid groups with an aromatic compound capable of coupling, followed by laking the coupling product, by carying out the laking in the presence of a. from 5 to 30 percent by weight based on the coupling product of a water-soluble salt of a polymerized abietic acid and b. from 5 to 15 percent by weight based on the coupling product of a water-soluble salt of a dialkyl ester of sulfosuccinic acid of from 5 to 15 carbon atoms in each alkyl group.

The lakable coupling product is obtained by a known method. Prior to laking there is added to the solution or suspension of the coupling product, conveniently at a temperature of from 0° to 40°C a salt of polymerized abietic acid in the form of an alkaline solution. At the same time or subsequently the sulfosuccinic dialkyl ester is added in the form of a solution of the salt and mixed well so that the components are uniformly dispersed. Then the laking agent is conveniently added in the form of a concentrated aqueous solution rapidly to the mixture, and the reaction mixture is heated as a rule to 60° to 75°C and stirred until laking is completed. In the laking the components contained in the mixture are commonly precipitated in the form of their salts which are not soluble in water. Processing is carried out conventionally by suction filtration, washing and drying of the residue.

Laked azo pigments are thus obtained which can be directly incorporated into the printing ink binder by means of a dissolver. The pigment is dispersed as finely as necessary for a printing ink after a short stirring period.

The polymerized abietic acids are prepared by polymerization of for example natural colophony. They are characterized by a softening point of about 95° to 105°C and an acid number of 140 to 150. As compared with colophony the polymerized abietic acids have improved resistance to oxidation, high temperature and crystallization.

Suitable polymerized abietic acids are available commercially, for example under the name Poly Pale Resin.

The polymerized abietic acids are added to the coupling products in amounts of from 5 to 30 percent, preferably from 10 to 20 percent, by weight (based on the coupling product to be laked) in the form of an aqueous solution of a soluble salt of the acid. The solution is conveniently prepared by dissolving the polymerized acid in hot alkali hydroxide solution and allowing the solution to cool. Potassium and sodium hydroxides are suitable as alkali metal hydroxides.

Suitable dialkyl esters of sulfosuccinic acid are those of 5 to 15, preferably of 8 to 10, carbon atoms in each alkyl group. Examples of these are the dipentyl, dihexyl, diheptyl, diundecyl, didodecyl, ditridecyl and ditetradecyl esters of sulfosuccinic acid and preferably the dioctyl, dinonyl, didecyl esters and mixtures of the same. The esters are also used in the form of their aqueous solutions, preferably in the form of their solutions of alkali metal salts. The amount of sulfocuccinic acid ester required is from 5 to 15 percent, preferably from 8 to 13 percent, by weight based on the coupling product.

The water-soluble salts of alkaline earth metals, preferably the chlorides of calcium, strontium and barium, are particularly suitable as laking agents.

The powdered pigments obtained according to the process of the invention are distinguished by outstanding tinctorial properties, such as high brilliance, high color strength, high transparency and particularly by excellent dispersion properties. In this property the laked azo pigment prepared according to the process of the invention are superior to the soft grain laked azo pigments prepared according to prior art methods. The laked azo pigments prepared according to the process of the invention may be stirred immediately into a printing ink binder by means of dissolver stirrers and acquire the fine dispersion required for a printing ink after a short time.

The following Examples illustrate the invention.

The parts and percentages given hereinafter are by weight.

EXAMPLE 1

27 parts of a 16.4 percent alkaline solution of a polymerized abietic acid and 6.5 parts of a 37 percent solution of dioctyl sulfosuccinate are added at 0° to 20°C to an aqueous solution of 22.5 parts of the dye sodium salt (prepared from 1-methyl-4-aminobenzene-3-sulfonic acid and 2-hydroxynaphthalene carboxylic acid-3 in a conventional manner by diazotization and coupling) and the whole is stirred for from 5 to 10 minutes. At the same temperature 30 parts of a 45 percent solution of calcium chloride in water is rapidly added and stirring is continued for another 15 minutes. The whole is then heated for 45 minutes at 60° to 75°C the precipitate is suction filtered, washed and dried at 80°C. The red pigment is ground to a fine powder and 5 parts thereof is stirred by means of a dissolver stirrer into 100 parts of a 30 percent solution of a modified phenol resin in toluene. A printing ink having good dispersion of the pigment is obtained after 20 minutes.

EXAMPLE 2

20.5 parts of a 16.4 percent alkaline solution of a polymerized abietic acid and 6.8 parts of a 37 percent solution of dioctyl sulfosuccinate are added at 0° to 20°C to an aqueous solution of 22.5 parts of the dye sodium salt specified in Example 1 and stirred for from 5 to 10 minutes. At the same temperature 30 parts of a 45 percent solution of calcium chloride in water is rapidly added and stirred for 15 minutes. The whole is then heated for 45 minutes at from 60° to 75°C, the precipitate is suction filtered, washed and dried at 80°C. The red pigment obtained is ground to a fine powder. 5 parts thereof is stirred by means of a dissolver stirrer into 100 parts of a 30 percent solution of a modified phenol resin in toluene and a printing ink of good dispersion is obtained after 20 minutes.

EXAMPLE 3

10.3 parts of a 16.4 percent alkaline solution of a polymerized abietic acid and 7.9 parts of a 37 percent solution of dioctyl sulfosuccinate are added at 0° to 20°C to an aqueous solution of 22.5 parts of a dye salt (sodium salt prepared by diazotization and coupling in a conventional manner from 1-methyl-4-aminobenzene-3-sulfonic acid and 2-hydroxynaphthalene carboxylic acid-3 and stirred for from 5 to 10 minutes. At the same temperature 30 parts of a 45 percent solution of calcium chloride in water is rapidly added and stirred for 15 minutes. The whole is then heated for 45 minutes at 60° to 75°C, the precipitate is suction filtered, washed and dried at 80°C. The red pigment is ground to a fine powder of which 5 parts is stirred by means of a dissolver stirrer into 100 parts of a 30 percent solution of a modified phenol resin in toluene. After 20 minutes a printing ink is obtained with good dispersion of the pigment.

EXAMPLE 4

41.0 parts of a 16.4 percent alkaline solution of a polymerized abietic acid and 3.1 parts of a 37 percent solution of dioctyl sulfosuccinate are added at 0° to 20°C to an aqueous solution of 22.5 parts of a dye salt (sodium salt) which has been prepared from 1-methyl-4-amino-benzene-3-sulfonic acid and 2-hydroxynaphthalene carboxylic acid-3 in the conventional manner by diazotization and coupling and stirred for 5 to 10 minutes. At the same temperature 30 parts of a 45 percent solution of calcium chloride in water is added rapidly and stirred for 15 minutes. The whole is then heated for 45 minutes at 60° to 75°C, the precipitate is suction filtered, washed and dried at 80°C. The red pigment is ground to a fine powder of which 5 parts is stirred into 100 parts of a 30 percent solution of a modified phenol resin in toluene by means of a dissolver stirrer. After 20 minutes a printing ink is obtained having good dispersion of the pigment.

EXAMPLE 5

20.5 parts of a 16.4 percent alkaline solution of a polymerized abietic acid and 6.8 parts of a 37 percent solution didecyl sulfosuccinate are added at 0° to 20°C to an aqueous solution of 22.5 parts of a dye salt (sodium salt) prepared from 1-methyl-4-aminobenzene-3-sulfonic acid and 2-hydroxynaphthalene carboxylic acid-3 in the conventional manner by diazotization and coupling, and stirred for 5 to 10 minutes. At the same temperature 30 parts of a 45 percent solution of calcium chloride in water is added rapidly and stirred for 15 minutes. The whole is then heated for 45 minutes at 60° to 75°C and the precipitate is suction filtered, washed and dried at 80°C. The red pigment is ground to a fine powder and 5 parts thereof is stirred by means of a dissolver stirrer into 100 parts of a 30 percent solution of a modified phenol resin in toluene. After 20 minutes a printing ink is obtained with good dispersion of the pigment.

EXAMPLE 6

27 parts of a 16.4 percent alkaline solution of a polymerized abietic acid and 6.5 parts of a 37 percent solution of dihexyl sulfosuccinate are added to an aqueous solution of 22.5 parts of a dye salt (sodium salt prepared from 1-methyl-4-aminobenzene-3-sulfonic acid and 2-hydroxynaphthalene carboxylic acid-3 in the usual way by diazotization and coupling) at 0° to 20°C and stirred for 5 to 10 minutes. At the same temperature 30 parts of a 45 percent solution of calcium chloride in water is rapidly added and stirred for 15 minutes. The whole is then heated for 45 minutes at 60° to 75°C, the precipitate is suction filtered, washed and dried at 80°C. The red pigment obtained is ground to a fine powder and 5 parts thereof is stirred by means of a dissolver stirrer into 100 parts of a 30 percent solution of a modified phenol resin in toluene. After 20 minutes a printing ink is obtained with good dispersion of the pigment.

EXAMPLE 7

20.5 parts of a 16.4 percent alkaline solution of a polymerized abietic acid and 6.8 parts of a 37 percent solution of dioctyl sulfosuccinate are added at 0° to 20°C to an aqueous solution of 23.7 parts of the dye salt (sodium salt prepared from 1-methyl-2-chloro-4-aminobenzene-5-sulfonic and and 2-hydroxynaphthalene carboxylic acid-3 in the usual way by diazotization and coupling) and stirred for 5 to 10 minutes. At the same temperature 30 parts of a 45 percent solution of calcium chloride in water is rapidly added and stirred for 15 minutes. The whole is then heated for 45 minutes at 60° to 75°C, the precipitate is suction filtered, washed and dried at 80°C. The red pigment obtained is ground to a fine powder and 5 parts thereof is stirred by means of a dissolver stirrer into 100 parts of a 30 percent solution of a modified phenol resin in toluene. After 20 minutes a printing ink is obtained with good dispersion of the pigment.

EXAMPLE 8

27 parts of a 16.4 percent alkaline solution of a polymerized abietic acid and 7.9 parts of a 37 percent solution of dioctyl sulfosuccinate are added at 0° to 20°C to an aqueous solution of 23.7 parts of the dye salt (sodium salt prepared from 1-methyl-2-chloro-4-aminobenzene-5-sulfonic acid and 2-hydroxynaphthalene carboxylic acid3 in the usual way by diazotization and coupling) and stirred for 5 to 10 minutes. At the same temperature 30 parts of a 45 percent solution of calcium chloride in water is added rapidly and stirred for 15 minutes. The whole is then heated at 60° to 75°C for 45 minutes, the precipitate is suction filtered, washed and dried at 80°C. The red pigment obtained is ground to a fine powder. 5 parts thereof is stirred by means of a dissolver stirrer into 100 parts of a 30 percent solution of a modified phenol resin in toluene. After 20 minutes a printing ink is obtained with a good dispersion of the pigment.

EXAMPLE 9

27 parts of a 16.4 percent alkaline solution of a polymerized abietic acid and 6.5 parts of a 37 percent solution of dioctyl sulfosuccinate are added at 0° to 20° C to an aqueous solution of 23.7 parts of the dye salt (sodium salt prepared from 1-methyl-2-chloro-4-aminobenze e-5-sulfonic acid and 2-hydroxynaphthalene carboxylic acid-3 in the usual way by diazotization and coupling) and stirred for 5 to 10 minutes. At the same temperature 44.5 parts of a 35 percent solution of barium chloride in water is added rapidly and stirred for 15 minutes. The whole is then heated for 45 minutes at 60° to 75°C, the precipitate is suction filtered, washed and dried at 80°C. The red pigment obtained is ground to a fine powder. 5 parts thereof is stirred by means of a dissolver stirrer into 100 parts of a 30 percent solution of a modified phenol resin in toluene. After 20 minutes a printing ink is obtained with a good dispersion of the pigment.

I claim:

1. In a process for the production of a laked azo pigment obtained by coupling an aromatic amine bearing an acid group with an aromatic compound capable of coupling followed by laking of the coupling product, the improvement for obtaining a more easily dispersable pigment which comprises carrying out the laking step in the presence of:
   a. from 5 to 30 percent by weight (based on the coupling product) of a water-soluble salt of polymerized abietic acid; and
   b. from 5 to 15 percent by weight (based on the coupling product) of a water-soluble salt of a dialkyl sulfosuccinate of 5 to 15 carbon atoms per alkyl group.

2. A process as claimed in claim 1 wherein the amount of component (a) is from 10 to 20 percent by weight and the amount of component (b) is from 8 to 13 percent by weight (based on the coupling product).

3. A process as claimed in claim 1 wherein component (b) is a dialkyl sulfosuccinate of 8 to 10 carbon atoms per alkyl group.

4. A process as claimed in claim 1 wherein the polymerized abietic acid of component (a) has a softening point of from 95° to 105°C. and an acid number of from 140 to 150.

5. A process as claimed in claim 1 wherein component (b) is dioctyl sulfosuccinate, didecyl sulfosuccinate or a mixture of the same.

6. A process as claimed in claim 1 wherein components (a) and (b) are used in the form of aqueous solutions.

7. A process as claimed in claim 6 wherein components (a) and (b) are used in the form of their sodium or potassium salts or a mixture of the same.

8. A process as claimed in claim 1 wherein a water-soluble salt of calcium, strontium or barium is used as a laking agent.

9. The easily dispersable laked azo pigment obtained by the process of claim 1.

* * * * *